June 25, 1929.  L. K. MARSHALL  1,718,749
HEAT CONTROL
Filed Nov. 22, 1923

Inventor:
Laurence K. Marshall
by Roberts, Roberts & Cushman
Attys.

Patented June 25, 1929.

1,718,749

UNITED STATES PATENT OFFICE.

LAURENCE K. MARSHALL, OF WEST SOMERVILLE, MASSACHUSETTS, ASSIGNOR TO SPENCER THERMOSTAT COMPANY, OF CAMBRIDGE, MASSACHUSETTS, A CORPORATION OF MASSACHUSETTS.

HEAT CONTROL.

Application filed November 22, 1923. Serial No. 676,301.

The invention relates to temperature responsive apparatus, and more particularly to circulating systems such as heating or cooling systems.

Thermostats or other temperature responsive devices are frequently employed in fluid circulating systems to respond to extreme temperatures in the fluid. However, if the fluid stops circulating the thermostat may fail to respond to an extreme temperature at some point in the fluid remote from the thermostat. This difficulty increases with the distance in the fluid circuit between the thermostat and the place where the extreme temperature occurs.

Examples of these conditions are found in many cooling and condensing systems for media discharged from a heated reservoir, still, or other device to be heated, it being inconvenient or impracticable to place a thermostat near the location where an extreme temperature initially occurs, while a thermostat in any other position fails to respond promptly, or at all, to an extreme temperature when the velocity of fluid circulation decreases below a certain value. When an extreme temperature occurs in the circulating medium, the source of this extreme temperature should be correspondingly controlled in order to prevent damage to apparatus or material resulting from the abnormal temperature, consequent pressure, or other condition.

Objects of the present invention are to overcome the above difficulties; to provide apparatus capable of positively responding to changes in the temperature of a moving medium or to conditions conducive to changes in the temperature of the medium; to provide simple and reliable apparatus responsive to changes in the temperature of a medium or to conditions leading to changes in the temperature of the medium for controlling the primary source of these changes; to provide simple apparatus for efficiently responding to changes in the velocity of circulation of a cooling fluid; to provide apparatus responsive to changes in the effectiveness of a cooling or condensing fluid for controlling the supply of heat to the medium being cooled or condensed, and generally to improve apparatus of the kind referred to.

In one aspect the invention comprises a heat-transfer system, such as an air or water heating or cooling system, having a fluid circulating passageway for the heating or cooling fluid, with a thermostat in conductive or other heat-transfer relation to the fluid in the passageway, and heat-transfer means associated with the thermostat rapidly to affect the thermostat under varied conditions of fluid circulation. When the circulating fluid is a cooling fluid the heat-transfer means may be in the form of an electric heater which, when the circulation of the cooling fluid decreases below a predetermined rate, quickly operates the thermostat. Thus the thermostat operates according to the differential effect of the heater and cooling fluid. So long as heat is conveyed away from the thermostat by the cooling fluid as rapidly as the heat is supplied by the heater, the thermostat remains unaffected; and in most applications of the invention this would be the normal condition. However, when the rate of circulation decreases heat is applied to the thermostat faster than it is absorbed by the cooling fluid and inasmuch as this differential action is cumulative the thermostat responds with rapidity. Ordinarily the relation of the thermostat to the heater on the one hand and to the cooling fluid on the other hand is such that most of the heat from the heater merely passes to and from the region of the thermostat, not into and out of the thermostatic material per se, and the appended claims are to be so interpreted.

In another aspect the invention comprises heat apparatus, such as a still, an electric coil or other means for applying heat to a part of the apparatus (the boiler), a cooling-fluid conduit for cooling a part of the apparatus (the condenser), a thermostat in heat-transfer relation to the conduit, an electric circuit or other suitable means controlled by the thermostat for regulating the supply of heat, and an auxiliary heater in heat-transfer relation to the thermostat to control the action of the thermostat as aforesaid. The thermostat control preferably shuts off the auxiliary heater when the main heater is shut off to avoid excessive overheating of the thermostat. In applying the invention to an internal combustion engine the thermostat and auxiliary heater would be associated with the water or air cooling passageway and the thermostat would either shut off the fuel or open the ignition circuit.

In still another aspect the invention involves a device comprising the thermostat and auxiliary heat-transfer means united in a unitary structure adapted to be readily applied to a heating (or cooling) system.

The invention will now be described in connection with a specific embodiment with particular reference to the accompanying drawings in which.

Figure 1:
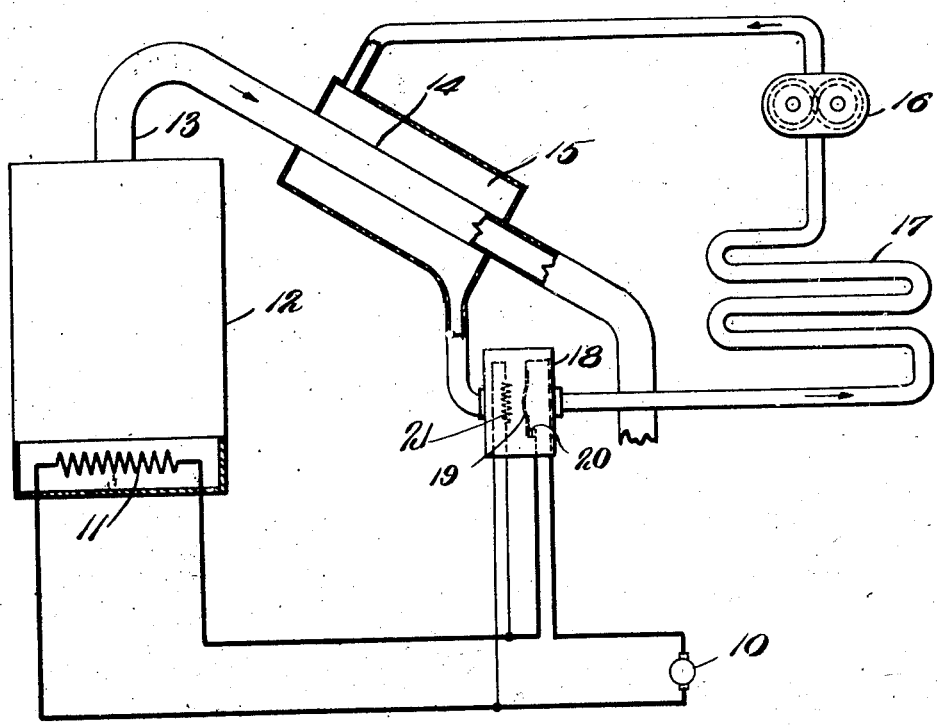
Fig. 1 is a diagrammatical elevation partly in section, of an embodiment.
Figure 2:
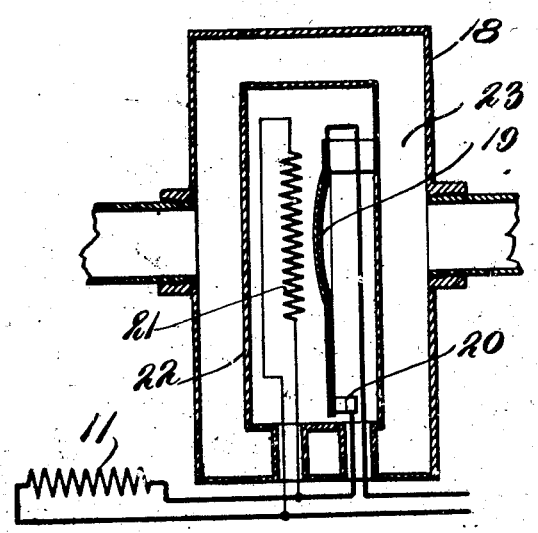
Fig. 2 is an enlarged vertical section of a portion of Fig. 1.

A source of electrical energy 10 connects with the resistance 11 which heats the reservoir, still, or other device 12 to be heated. An outlet conduit 13 having a depending portion 14 to be cooled discharges a heated medium which may be vapor or liquid from the reservoir. The cooling jacket 15 surrounding condenser 14 directs cooling fluid into contact with conduit 14 to cool the fluid or condense the vapor therein, thus forming a cooling chamber for conduit or condenser 14. Rotary pump 16 or any other suitable form of pump of well known design circulates the cooling fluid as indicated by the arrows. The radiator 17 in series with pump dissipates heat absorbed from conduit 14 by the cooling fluid.

The control chamber 18, which is connected in the cooling fluid circuit by threaded connections, houses the thermostat 19 which is preferably of the quick acting type such, for example, as that disclosed in Patent No. 1,448,240, March 13, 1923, to John A. Spencer, but may be of any other suitable form. Contacts 20 of the thermostat are in series between source 10 and auxiliary heating resistance 11, the thermostat being adjusted to operate at a predetermined increasing high temperature to open contacts 20 and disconnect source 10 from resistance 11, and to operate at a predetermined decreasing low temperature to close the contacts and reconnect source 10 and resistance 11. The auxiliary heating resistance 21 is connected in parallel with resistance 11 and is thus supplied with current from source 10, or it may be connected to any other suitable source of substantially constant voltage.

Chamber 22 houses the thermostat and electric circuits and keeps them from actual contact with the cooling fluid, but may be omitted, if desired, in cases where the cooling fluid is a good insulator, such as oil, or is of relatively high resistance, such as tap water. Inner chamber 22 is spaced from the walls of the outer chamber 18 to provide an intermediate chamber 23 for circulation of the cooling fluid which may completely surround chamber 22 to maintain it at substantially the same temperature as the cooling fluid.

Under normal conditions of operation when resistance 11 is connected to source 10, heated fluid is discharged through conduit 14 where it is cooled or condensed by the cooling fluid circulating through cooling chamber 15 and control chamber 18. Thermostat 19 is normally heated by resistance 21 and cooled by the cooling fluid so that it assumes a differential temperature between that of the cooling fluid and resistance 21, and the apparatus continues to operate normally as long as the fluid remains below a predetermined temperature and as long as the circulation is maintained above a predetermined velocity, or in other words as long as the proper cooling effect takes place in chambers 14 and 22. However, when the fluid discharged from reservoir 12 is excessively hot, or the cooling fluid is insufficiently cooled by radiator 17, or fails to circulate with sufficient velocity owing to failure of pump 16 or other cause, thermostat 19 is no longer sufficiently cooled and operates to open contacts 20 and cut off the current from both resistances 11 and 21, thus allowing them to cool off. When the cooling fluid again functions to reduce the temperature of condenser 14 to normal it also cools thermostat 19 thereby causing it to reestablish the connection from source 10 to resistances 11 and 21 so that the apparatus returns to its initial condition.

The cycle of events just described may recur repeatedly at a rate depending upon the temperature of the fluid in conduit 14 and chamber 15 and the velocity of circulation of the cooling fluid. The effect of repeatedly applying and removing the heat supply is integrated and averaged over a period of time so that the resulting temperature of fluid discharged from conduit 14 is maintained closely between predetermined limits.

Inasmuch as source 10 is disconnected from resistance 11 when improper cooling takes place in conduit 14 and is again connected to resistance 11 when the apparatus has cooled down to a temperature at which improper heating takes place the apparatus is protected against excessive heating or cooling with consequent extreme temperatures or pressures or waste of fluid by improper heat and pressure treatment. It will thus be observed that the invention provides temperature responsive apparatus particularly suited for automatically controlling the temperature of a reservoir 12 in response to extreme temperatures, or conditions leading to extreme temperature in a discharge conduit 14 from the reservoir, being effective to automatically reduce temperatures when they tend to become excessively high and to automatically increase temperatures when they tend to become excessively low.

Thus it will be seen that I have devised a heat transfer system in which one system communicates with two other systems at two parts of the first system and also a thermostat to regulate one system according to the condition of another system. In another aspect of the case I have provided one system having two branches, one branch being in thermal communication with another system, which is itself in thermal communication with a third system and the other branch of the first system being in thermal communication with a thermostat which is in thermal communication with the third system. The thermostat is adapted to control both branches of the first system according to the condition of one of the other systems.

I claim:

1. Apparatus of the character described comprising, in combination, temperature responsive means adapted to be in heat-transfer relation with a moving medium, and means for subjecting said responsive means to temperature variations like but in excess of temperature variations in said moving medium, said last mentioned means normally maintaining the temperature of said temperature responsive means above the temperature of the moving medium.

2. Apparatus of the character described comprising in combination, temperature responsive means adapted to be in heat-transfer relation with a moving medium, and means for subjecting said responsive means to temperature variations like but in excess of temperature variations in said moving medium, said last mentioned means including a heating element whose generated heat is normally carried away by the moving medium.

3. In apparatus of the character described, a reservoir, means for electrically heating the fluid in said reservoir, a discharge conduit for conducting heated fluid from said reservoir, a cooling conduit for said discharge conduit, a thermostat in heat-transfer relation to fluid in said cooling conduit and having contacts to control said heating means, and means for electrically heating said thermostat to cause it to open said contacts to disconnect said reservoir heating means in response to predetermined changes in the condition of the fluid in said cooling conduit.

4. In apparatus of the class described a fluid heater, a discharge conduit for conducting heated fluid from said reservoir, a cooling conduit for said discharge conduit, a thermostat in heat-transfer relation to fluid in said cooling conduit, means controlled by said thermostat for varying the heat supplied to the fluid in said heater, and an auxiliary heater in heat-transfer relation to said thermostat, whereby the action of the thermostat is the result of the differential effect of the auxiliary heater and the cooling fluid.

5. A heat-transfer system comprising heat apparatus, means for applying heat to a part of said apparatus, means for cooling a part of said apparatus including a conduit for cooling fluid, a thermostat associated with said conduit, means controlled by said thermostat for regulating said first means, and a heater associated with said thermostat, whereby the action of the thermostat is the result of the differential action of said heater and cooling fluid.

6. A heat-transfer system comprising heat apparatus, means for applying heat to a part of said apparatus, means for cooling a part of said apparatus including a conduit for cooling fluid, a thermostat associated with said conduit, means controlled by said thermostat for regulating said first means, and a heater associated with said thermostat to modify the effect of the cooling fluid upon the thermostat, said heater also being controlled by the thermostat.

7. A heat-transfer system comprising heat apparatus, means for supplying heat to a part of said apparatus, means for cooling a part of said apparatus including a conduit for cooling fluid, a thermostat in heat-transfer relation to said cooling fluid, means for supplying heat to said thermostat, and means responsive to said thermostat for interrupting both of said heat supplies.

8. In a fluid circulatory system, the combination of a moving fluid, means for heating the same, a thermostat responsive to temperature changes of said fluid, a second heating source located in heat-transfer relation to the thermostat and means including the latter for rendering inoperative both of the heating devices.

9. In a fluid circulatory system the combination of a moving fluid, a device responsive to temperature changes of said fluid, electrically energized means for heating both of the fluid and the temperature responsive device and means, including the latter, for rendering said first-mentioned means inoperative.

10. In a fluid circulatory system, the combination of a moving fluid, a thermostat in heat-transfer relation therewith, means deriving energy from an electrical source for heating both of the fluid and the thermostat, the latter, upon a temperature increase above a predetermined limit, operating to disconnect the heating means from said source.

Signed by me at Cambridge, Mass., this 20th day of November, 1923.

LAURENCE K. MARSHALL.